US012272246B2

(12) United States Patent
Andon et al.

(10) Patent No.: US 12,272,246 B2
(45) Date of Patent: *Apr. 8, 2025

(54) INTELLIGENT ELECTRONIC FOOTWEAR AND CONTROL LOGIC FOR EXECUTING AUTOMATED FOOTWEAR FEATURES

(71) Applicant: NIKE, Inc., Beaverton, OR (US)

(72) Inventors: Christopher Andon, Portland, OR (US); Jamian R. Cobbett, Portland, OR (US); Vikram Malhotra, Portland, OR (US); Hien Tommy Pham, Beaverton, OR (US)

(73) Assignee: NIKE, Inc., Beaverton, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/394,918

(22) Filed: Dec. 22, 2023

(65) Prior Publication Data

US 2024/0144827 A1 May 2, 2024

Related U.S. Application Data

(60) Division of application No. 17/395,561, filed on Aug. 6, 2021, now Pat. No. 11,900,810, which is a
(Continued)

(51) Int. Cl.
*G08G 1/16* (2006.01)
*A43B 3/34* (2022.01)
(Continued)

(52) U.S. Cl.
CPC .............. *G08G 1/166* (2013.01); *A43B 3/34* (2022.01); *A43B 3/36* (2022.01); *A43B 3/44* (2022.01);
(Continued)

(58) Field of Classification Search
USPC ........... 340/435, 539.14, 636.11, 455, 457.1, 340/457.2, 463, 467, 488, 538.15, 539.11
See application file for complete search history.

(56) References Cited

U.S. PATENT DOCUMENTS 10,123,396 B2  11/2018  Jeremy et al.
10,441,020 B1 * 10/2019  Andon .................. H04W 4/023
(Continued)

FOREIGN PATENT DOCUMENTS

CN   103903477 A   7/2014
CN   104781635 A   7/2015
(Continued)

OTHER PUBLICATIONS

J. Kymissis, et al., "Parasitic Power Harvesting in Shoes", Wearable Computers, 1998. Digest of Papers. Second International Symposium on Pittsburgh, PA, USA Oct. 19-20, 1998, Los Alamitos, CA, IEEE Comput. Soc, US (Oct. 19, 1998), pp. 132-139.

*Primary Examiner* — Daniel Previl
(74) *Attorney, Agent, or Firm* — Quinn IP Law

(57) ABSTRACT

Presented are intelligent electronic footwear with controller automated features, methods for making/using such footwear, and control systems for executing automated features of intelligent electronic footwear. An intelligent electronic shoe (IES) includes an upper that attaches to a user's foot, and a sole structure that is attached to the upper and supports thereon the user's foot. An alert system, which is mounted to the sole structure and/or upper, generates predetermined outputs in response to electronic command signals. The IES system also includes a wireless communications device that wirelessly communicates with a remote computing node, and a footwear controller that communicates with the wireless communications device and alert system. The footwear controller receives location data indicative of the user's and remote computing node's locations, determines whether the
(Continued)

user's location is within a predetermined location/proximity to the node's location and, if so, transmits command signals to the alert system to notify the user/vehicle.

20 Claims, 5 Drawing Sheets

Related U.S. Application Data continuation of application No. 16/864,309, filed on May 1, 2020, now Pat. No. 11,109,634, which is a continuation of application No. 16/561,324, filed on Sep. 5, 2019, now Pat. No. 10,674,783, which is a continuation of application No. 16/220,403, filed on Dec. 14, 2018, now Pat. No. 10,441,020, which is a continuation of application No. 16/114,632, filed on Aug. 28, 2018, now Pat. No. 10,178,890.

(60) Provisional application No. 62/678,796, filed on May 31, 2018.

(51) Int. Cl.
| | |
|---|---|
| A43B 3/36 | (2022.01) |
| A43B 3/44 | (2022.01) |
| A43B 3/48 | (2022.01) |
| A43B 3/50 | (2022.01) |
| A43C 19/00 | (2006.01) |
| B60Q 1/14 | (2006.01) |
| B60Q 1/26 | (2006.01) |
| B60Q 1/50 | (2006.01) |
| B60Q 5/00 | (2006.01) |
| B60Q 9/00 | (2006.01) |
| G01S 5/00 | (2006.01) |
| G01S 19/19 | (2010.01) |
| G06F 1/16 | (2006.01) |
| G08B 7/06 | (2006.01) |
| G08B 21/02 | (2006.01) |
| G08G 1/005 | (2006.01) |
| H04W 4/02 | (2018.01) |
| H04W 4/021 | (2018.01) |
| H04W 4/80 | (2018.01) |
| A43C 11/16 | (2006.01) |
| G01S 19/49 | (2010.01) |

(52) U.S. Cl.
CPC ............ *A43B 3/48* (2022.01); *A43B 3/50* (2022.01); *A43C 19/00* (2013.01); *B60Q 1/14* (2013.01); *B60Q 1/2673* (2013.01); *B60Q 1/525* (2013.01); *B60Q 5/006* (2013.01); *B60Q 9/008* (2013.01); *G01S 5/0027* (2013.01); *G01S 5/0072* (2013.01); *G01S 19/19* (2013.01); *G06F 1/163* (2013.01); *G08B 7/06* (2013.01); *G08B 21/02* (2013.01); *G08G 1/005* (2013.01); *G08G 1/162* (2013.01); *H04W 4/021* (2013.01); *H04W 4/023* (2013.01); *H04W 4/80* (2018.02); *A43C 11/165* (2013.01); *B60Q 2300/05* (2013.01); *G01S 19/49* (2013.01)

(56) References Cited

U.S. PATENT DOCUMENTS

| | | | |
|---|---|---|---|
| 10,674,783 B2* | 6/2020 | Andon | G08B 21/02 |
| 11,109,634 B2* | 9/2021 | Andon | H04W 4/021 |
| 11,900,810 B2* | 2/2024 | Andon | G06F 1/163 |
| 2003/0067245 A1 | 4/2003 | Pelrine et al. | |
| 2005/0002179 A1 | 1/2005 | Gonet | |
| 2005/0073438 A1 | 4/2005 | Rodgers et al. | |
| 2007/0028486 A1 | 2/2007 | Montanya et al. | |
| 2007/0201221 A1 | 8/2007 | Cherdak et al. | |
| 2016/0324257 A1* | 11/2016 | Ko | A43B 13/145 |
| 2017/0026504 A1* | 1/2017 | Nichols | A61B 5/746 |
| 2017/0092126 A1* | 3/2017 | Oshida | G08G 1/005 |
| 2017/0214702 A1* | 7/2017 | Moscovici | H04W 12/106 |
| 2018/0078207 A1* | 3/2018 | Moran | H04B 1/385 |
| 2019/0289950 A1 | 9/2019 | Matsumoto et al. | |

FOREIGN PATENT DOCUMENTS

| | | |
|---|---|---|
| CN | 106418873 A | 2/2017 |
| CN | 106525022 A | 3/2017 |
| CN | 106652556 A | 5/2017 |
| CN | 107274722 A | 10/2017 |
| CN | 108497607 A | 9/2018 |
| CN | 108924735 A | 11/2018 |
| DE | 102013206023 A1 | 10/2014 |
| EP | 2290721 A1 | 3/2011 |
| JP | 2004187808 A | 7/2004 |
| JP | 2011210219 A | 10/2011 |
| WO | 2016167230 A1 | 10/2016 |
| WO | 2017223424 A1 | 12/2017 |

* cited by examiner

INTELLIGENT ELECTRONIC FOOTWEAR AND CONTROL LOGIC FOR EXECUTING AUTOMATED FOOTWEAR FEATURES

CLAIM OF PRIORITY AND CROSS-REFERENCE TO RELATED APPLICATIONS

This application is a divisional of U.S. patent application Ser. No. 17/395,561, which was filed on Aug. 6, 2021, is now allowed, and is a continuation of U.S. patent application Ser. No. 16/864,309, which was filed on May 1, 2020, is now U.S. Pat. No. 11,109,634 B2, and is a continuation of U.S. patent application Ser. No. 16/561,324, which was filed on Sep. 5, 2019, is now U.S. Pat. No. 10,674,783 B2, and is a continuation of U.S. patent application Ser. No. 16/220,403, which was filed on Dec. 14, 2018, is now U.S. Pat. No. 10,441,020 B1, and is a continuation of U.S. patent application Ser. No. 16/114,632, which was filed on Aug. 28, 2018, is now U.S. Pat. No. 10,178,890 B1, and claims the benefit of and priority to U.S. Provisional Patent App. No. 62/678,796, which was filed on May 31, 2018. All of the foregoing applications are incorporated herein by reference in their respective entireties and for all purposes.

TECHNICAL FIELD

The present disclosure relates generally to wearable electronic devices. More specifically, aspects of this disclosure relate to systems, methods, and devices for enabling automated features of intelligent electronic footwear and apparel.

BACKGROUND

Articles of footwear, such as shoes, boots, slippers, sandals, and the like, are generally composed of two primary elements: an upper for securing the footwear to a user's foot; and a sole structure for providing subjacent support for the foot. Uppers may be fabricated from a variety of materials—including textiles, foams, polymers, natural and synthetic leathers, etc. —that are stitched or adhesively bonded together to form a shell or harness for securely receiving a foot. For sandals and slippers, the upper may have an open toe or heel construction or may be generally limited to a series of straps extending over the instep and, in some designs, around the ankle Conversely, boot and shoe designs incorporate a full upper with a closed toe and heel construction, and an ankle opening through a rear quarter portion that provides access to the footwear's interior, facilitating entry and removal of the foot into and from the upper. A shoelace or strap may be utilized to secure the foot within the upper.

The sole structure is generally attached to a lower portion of the upper, positioned between the user's foot and the ground. In many articles of footwear, including athletic shoes, the sole structure is a layered construction that generally incorporates a comfort-enhancing insole, an impact-mitigating midsole, and a surface-contacting outsole. The insole, which may be located partially or entirely within the upper, is a thin and compressible member that provides a contact surface for the underside of the user's foot. By comparison, the midsole is mounted underneath the insole, forming a middle layer of the sole structure. In addition to attenuating ground reaction forces, the midsole may help to control foot motion and impart stability. Secured to the underside of the midsole is an outsole that forms the ground-contacting portion of the footwear and is usually fashioned from a durable and wear-resistant material that includes features for improving traction.

SUMMARY

Presented herein are intelligent electronic footwear with attendant control logic for enabling automated footwear capabilities, methods for making and methods for using such footwear, and control systems for provisioning automated features of intelligent electronic footwear. By way of example, there is presented an Internet of Adaptive Apparel and Footwear (IoAAF) system that wirelessly communicates with an intelligent electronic shoe (IES) to automate communication between the shoe and a motor vehicle, i.e., footwear-to-vehicle (F2V) communications. In a ride-sharing application, for example, a registered driver is paired with a ride-seeking passenger through a dedicated mobile application ("app") or a web-based applet operating on a personal smartphone or other handheld computing device. Once paired, the rider—while wearing an IES—may wait outside on a curb for the ride-share driver. To assist the driver with identifying the waiting rider, e.g., in instances where the rider is waiting in a crowd or on a busy sidewalk, the IES will automate a hailing feature that helps the driver spot their fare. In particular, the IES tracks the rider's and driver's real-time locations; upon determining that the rider's location is within a predetermined location or proximity of the driver's location, the IES will automatically generate a visual or audible output sufficient to draw attention to the rider. For instance, an IES processor built into the midsole of the shoe issues a command signal to a built-in shoe light system, causing the lights to illuminate, flash, change color, or a combination thereof. Optionally, or alternatively, the IES processor may wirelessly transmit a command prompt to a vehicle control system to responsively produce a visual or audible output, such as activating the vehicle horn or vehicle light system, to help the rider identify the driver.

To enable wireless communications between an IES and a remote electronic device, such as the ride-share driver's automobile, the IES may piggyback a communications session established by the user's smartphone, handheld computing device, or other portable electronic device with wireless communications capabilities. Alternatively, the IES may operate as a standalone device with a resident wireless communications device that is packaged within the shoe structure. Other peripheral hardware may include resident memory, controller, shortwave antenna, rechargeable battery, SIM card, etc., all of which are housed inside the shoe structure. An IES may be equipped with a human-machine interface (HMI) that allows the user to interact with the footwear and/or the IoAAF system. For instance, one or more electroactive polymer (EAP) sensors may be woven into or formed as patches mounted on the shoe structure and operable to receive user inputs that allow the user to control operational aspects of the IES. Likewise, any of the attendant operations for executing an automated footwear feature may be executed locally via the IES processor or may be off-boarded in a distributing computing fashion for execution by the smartphone, handheld computing device, IoAAF system, or any combination thereof.

As yet a further option, execution of any one or more desired footwear features may initially require security authentication of a user via the IES controller and/or an IoAAF system server computer. For instance, a distributed array of sensors within the shoe structure communicates with the IES processor to perform biometric validation, such as confirming a user's weight (e.g., via pressure sensors), shoe size (e.g., via Electro Adaptive Reactive Lacing (EARL)), toe print (e.g., via an optical fingerprint sensor), or other suitable method. As an extension of this concept, any of the foregoing sensing devices may be employed as a binary (ON/OFF) switch to confirm the IES is actually on a user's foot when attempting to execute an automated feature. Once security authentication is established, an intelligent electronic shoe may also be used as a means for making or accepting a payment or as part of a commercial transaction.

Provisioning wireless data exchanges to facilitate execution of an automated feature may require the IES be registered with the IoAAF system. For instance, a user may record an IES serial number with the IoAAF system, which will then issue a validation key to a personal account, e.g., a "digital locker" operating on the user's smartphone, tablet, PC, or laptop, to provide additional authentication. Registration may be completed manually, e.g., via the user, or digitally, e.g., via a barcode or near-field communication (NFC) tag on the shoe. A unique virtual shoe may be assigned to an IES and stored in the digital locker; each virtual shoe may be backed by a blockchain security technology designed to help guarantee uniqueness and authenticity, such as a cryptographic hash function, a trusted timestamp, correlating transaction data, etc. Once properly verified, the IES may be used to authenticate the user for entry to concerts, movies, sporting events, airplanes, other mass transit, and the like. While described with reference to an article of footwear as a representative application for the novel concepts presented herein, it is envisioned that many of the disclosed options and features may be applied to other wearable apparel, including clothing, headgear, eyewear, wrist wear, neck wear, leg wear, and the like.

Aspects of the present disclosure are directed to networked control systems and attendant logic for executing automated footwear features. For instance, an intelligent electronic shoe system is presented that includes an article of footwear with an upper that attaches to a user's foot, and a sole structure that is attached to the upper and supports thereon the user's foot. The sole structure includes an outsole that defines a bottom-most, ground-engaging portion of the article of footwear. A controller-automated alert system, which is mounted to the footwear's sole structure and/or upper, is operable to generate visible, audible and/or tactile outputs in response to one or more electronic command signals. The IES system also includes a wireless communications device that wirelessly communicates with a remote computing node, and a system controller that communicates with the wireless communications device and alert system. This controller, which may be resident to or remote from the footwear, is programmed to receive location data that is indicative of the user's location and the remote computing node's location. Using this data, the controller determines whether the user's location is within a predetermined location or proximity to the node's location. In response to the user's location being within either the predetermined location or the predetermined proximity to the node's location, the system controller automatically transmits a command signal to the alert system to generate a predetermined visible, audible, and/or tactile alert that is perceptible by the user and/or motor vehicle, e.g., thereby notifying one or both parties of their relative proximity/location.

Additional aspects of this disclosure are directed to methods for assembling and methods for operating any of the disclosed systems and devices. In an example, a method is presented for manufacturing an article of footwear for a foot of a user. This representative method includes, in any order and in any combination with any of the above or below disclosed features and options: providing an upper configured to receive and attach to the foot of the user; providing a sole structure configured to support thereon the foot of the user, the sole structure having an outsole defining a ground-engaging portion of the footwear; attaching the sole structure to the upper; mounting a controller-automated alert system to the sole structure and/or upper, the alert system being configured to generate audible, visible and/or tactile outputs in response to command signals; mounting a wireless communications device to the sole structure and/or the upper, the wireless communications device being configured to wirelessly communicate with a remote computing node; and mounting a resident controller to the sole structure and/or the upper. This resident controller is operatively connected to the wireless communications device and the alert system. The resident controller is programmed to: receive user location data indicative of a current location of the user; receive node location data indicative of a current location of the remote computing node; determine whether the user's location is within a predetermined location or proximity to the node's location; and respond to the user's location being within the predetermined location or proximity to the node's location by automatically transmitting a command signal to the alert system to generate a predetermined alert.

In another example, a method of executing an automated feature of an intelligent electronic shoe is presented. This representative method includes, in any order and in any combination with any of the above or below disclosed features and options: receiving, via a resident or remote wireless communications device, location data indicative of a user location of a user; receiving, via the wireless communications device, location data indicative of a node location of a remote computing node; determining, via a resident or remote footwear controller, whether the user is located within a predetermined location or a predetermined proximity to the node's location; and, in response to the user location being within either the predetermined location or proximity to the node location, the footwear controller automatically transmitting to a resident controller-automated alert system a command signal to generate a predetermined visible, audible and/or tactile alert perceptible by the user and/or motor vehicle, e.g., thereby notifying one or both parties of their relative proximity/location.

Further aspects of the present disclosure are directed to footwear with automated lighting capabilities. For instance, an article of footwear includes an upper that receives, at least partially covers, and attaches to a user's foot. A sole structure, which is attached to a lower portion of the upper and supports thereon the user's foot, includes an outsole that defines the footwear's ground-engaging surface. A resident alert system is mounted to the sole structure and selectively actuable to generate visible, audible and/or tactile alerts in response to electronic command signals. A resident wireless communications device is mounted inside the sole structure and operable to wirelessly communicate with a remote computing node, such as a motor vehicle, remote back-end server computer, middleware node, dedicated software app operating on a portable electronic device, etc.

Continuing with the above example, the footwear is also equipped with a resident controller that is mounted inside the sole structure and communicatively connected to the wireless communications device and alert system. This resident controller is programmed to receive location data indicative of the user's current location and the remote computing node's current location. The resident controller then determines whether the user's current location is within a predetermined location/proximity to the node's current location. If so, the resident controller responsively transmits one or more command signals to the alert system to generate a predetermined alert notifying the user/vehicle of their relative closeness.

For any of the disclosed systems, methods and devices, the footwear controller may transmit a command signal to a control system of the remote computing node to generate an audible or visual output, e.g., in response to the user location being within the predetermined location/proximity to the node location. For example, the remote computing node may be a motor vehicle with a vehicle headlamp system; in this instance, the visual output prompted by the footwear controller may include illumination, flashing and/or intensification of the light output of the vehicle's headlamp system. Optionally, the footwear controller may be operable to coordinate the light output of the vehicle headlamp system with a predetermined light output of the IES alert system. In addition, an audible output prompted by the footwear controller may include activation and/or modulation of an audible output of the motor vehicle's horn system, infotainment system, or other vehicle subsystem capable of producing an audible output. Optionally, the footwear controller may be operable to coordinate the audible output of the vehicle audio system with a predetermined audio output of the IES alert system.

For any of the disclosed systems, methods and devices, the user may have a portable electronic device, such as a smartphone, tablet, and/or smartwatch; the wireless communications device may be designed to wirelessly connect to the portable electronic device and, through this connectivity, wirelessly communicate with the remote computing node. As another option, the alert system may include a haptic transducer that is mounted to the shoe structure. In this instance, the footwear controller's command signal causes the haptic transducer to generate a haptic cue, e.g., to notify the user when the user's location is within the predetermined location/proximity to the node's location. In the same vein, the alert system may include an audio system that is mounted to the shoe structure. The footwear controller's command signal may cause the audio system to generate a predetermined sound output, e.g., to notify the user when the user's location is within the predetermined location/proximity to the node's location.

For any of the disclosed systems, methods and devices, the remote computing node may be a central control unit for a resident or commercial security system. In this instance, the footwear controller may transmit a deactivation (or activation) command signal to the security system when the user's location is entering (or leaving) a predetermined location or proximity to the residence or building monitored by the security system. Likewise, the remote computing node may be a central control unit for a home automation system. In this instance, the footwear controller may transmit a command signal to the home automation system to lock or unlock a door, activate or deactivate a room light, and/or increase or decrease a temperature of a thermostat, e.g., in response to the user's location being within a predetermined location or proximity to a home or a specific room within the home associated with the home automation system. The predetermined location or proximity may be delineated by a geofence that is produced by the footwear controller. In this instance, a command signal is transmitted to the remote computing node or an IES subsystem upon detection of the remote computing node or IES breaching the geofence.

For any of the disclosed systems, methods and devices, a pressure sensor may be mounted to the shoe structure and configured to detect a presence of a foot in the upper. For some applications, the command signal may be transmitted to the IES alert system only when there is a detected presence of a foot in the upper. Foot presence sensing in an article of footwear may be achieved via a variety of methods, including pressure/force sensing, capacitive sensing, magnetic signal sensing, etc. Optionally, a pressure sensor may be mounted inside the sole structure and configured to detect a user's weight. From these sensor readings, the footwear controller may determine if the detected weight of a current user is within a predetermine range of a memory-stored validated user weight (i.e., authenticated to a registered user). Once validated, the footwear controller will then transmit the command signal to the IES alert system.

For any of the disclosed systems, methods and devices, the IES may include a shoelace that is attached to the upper, and a lace motor that is mounted inside the sole structure and operable to selectively transition the shoelace/strap between tensioned and untensioned states. The footwear controller may communicate with the lace motor to determine a current state of the shoelace. In this instance, a command signal may be transmitted to the IES alert system only when the shoelace is in the tensioned state. For at least some configurations, the tensioned state may include multiple discrete tensioned positions; the IES system may include a lace sensor that detects a current discrete tensioned position for a current user. The footwear controller may communicate with the lace sensor to determine if the current discrete tensioned position corresponds to a memory-stored validated lace tensioned position (i.e., authenticated to a registered user). Once the current user is validated, the footwear controller will then transmit the command signal to the IES alert system. Additional information regarding footwear with motorized lacing and gesture control capabilities can be found, for example, in U.S. Patent Application Publication Nos. 2016/0262485 and 2018/0020764, both of which are incorporated herein by reference in their respective entireties for all purposes. It is also envisioned that user recognition may be achieved via gait profiling and analysis, which may be determined from microelectromechanical systems (MEMS) in the shoe, e.g., to authenticate/validate a user (alone or in combination with validation on a smartphone).

For any of the disclosed systems, methods and devices, the remote computing node may include an optical sensor, e.g., as part of a digital camera. The predetermined output of the IES alert system may include a personalized color and/or an encoded blinking pattern that is detectable by the optical sensor and designed to verify the user to the remote computing node. For at least some applications, the wireless communications device may include a BLUETOOTH® Low Energy (BLE), low-power and wide-area category (CAT) M1 or narrow-band CAT-NB1 wireless interface. As another option, a barcode, a radio-frequency identification (RFID) tag, or a near-field communications (NFC) tag may be attached to the sole structure and/or the upper; these features are designed to communicate a security authentication code to the remote computing node.

The above summary does not represent every embodiment or every aspect of the present disclosure. Rather, the foregoing summary merely provides an exemplification of some of the novel concepts and features set forth herein. The above features and advantages, and other features and attendant advantages of this disclosure, will be readily apparent from the following detailed description of illustrated examples and representative modes for carrying out the present disclosure when taken in connection with the accompanying drawings and the appended claims. Moreover, this disclosure expressly includes any and all combinations and subcombinations of the elements and features presented above and below.

Figure 1:
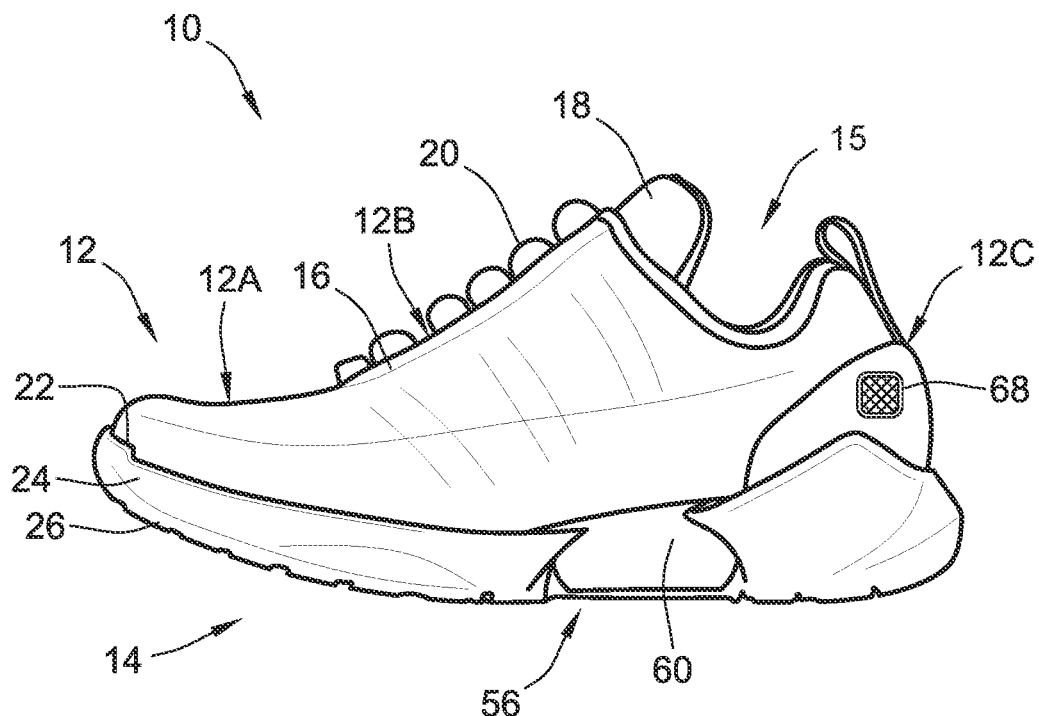
FIG. 1 is a lateral, side-view illustration of a representative intelligent electronic shoe with controller-automated footwear features in accordance with aspects of the present disclosure.

The present disclosure is amenable to various modifications and alternative forms, and some representative embodiments are shown by way of example in the drawings and are described in detail herein. It should be understood, however, that the novel aspects of this disclosure are not limited to the particular forms illustrated in the above-enumerated drawings. Rather, the disclosure is to cover all modifications, equivalents, combinations, subcombinations, permutations, groupings, and alternatives falling within the scope of this disclosure as encompassed by the appended claims.

DETAILED DESCRIPTION

This disclosure is susceptible of embodiment in many different forms. There are shown in the drawings and will herein be described in detail representative embodiments of the disclosure with the understanding that these illustrated examples are provided as an exemplification of the disclosed principles, not limitations of the broad aspects of the disclosure. To that end, elements and limitations that are described in the Abstract, Technical Field, Background, Summary, and Detailed Description sections, but not explicitly set forth in the claims, should not be incorporated into the claims, singly or collectively, by implication, inference, or otherwise.

For purposes of the present detailed description, unless specifically disclaimed: the singular includes the plural and vice versa; the words "and" and "or" shall be both conjunctive and disjunctive; the words "any" and "all" shall both mean "any and all"; and the words "including" and "comprising" and "having" shall each mean "including without limitation." Moreover, words of approximation, such as "about," "almost," "substantially," "approximately," and the like, may be used herein in the sense of "at, near, or nearly at," or "within 0-5% of," or "within acceptable manufacturing tolerances," or any logical combination thereof, for example. Lastly, directional adjectives and adverbs, such as fore, aft, medial, lateral, proximal, distal, vertical, horizontal, front, back, left, right, etc., may be with respect to an article of footwear when worn on a user's foot and operatively oriented with a ground-engaging portion of the sole structure seated on a flat surface, for example.

Referring now to the drawings, wherein like reference numbers refer to like features throughout the several views, there is shown in FIG. 1 a representative article of footwear, which is designated generally at 10 and portrayed herein for purposes of discussion as an athletic shoe or "sneaker." The illustrated footwear 10—also referred to herein as "intelligent electronic shoe" or "IES" for brevity—is merely an exemplary application with which novel aspects and features of this disclosure may be practiced. In the same vein, implementation of the present concepts for a wearable electronic device that is worn on a human's foot should also be appreciated as a representative application of the concepts disclosed herein. It will be understood that many aspects and features of this disclosure may be integrated into other footwear constructions and may be incorporated into any logically relevant type of wearable electronic device. As used herein, the terms "shoe" and "footwear," including permutations thereof, may be used interchangeably and synonymously to reference any relevant type of garment worn on a foot. Lastly, the features illustrated in the drawings are not necessarily to scale and are provided purely for instructional purposes. Thus, the specific and relative dimensions shown in the drawings are not to be construed as limiting.

Figure 2:
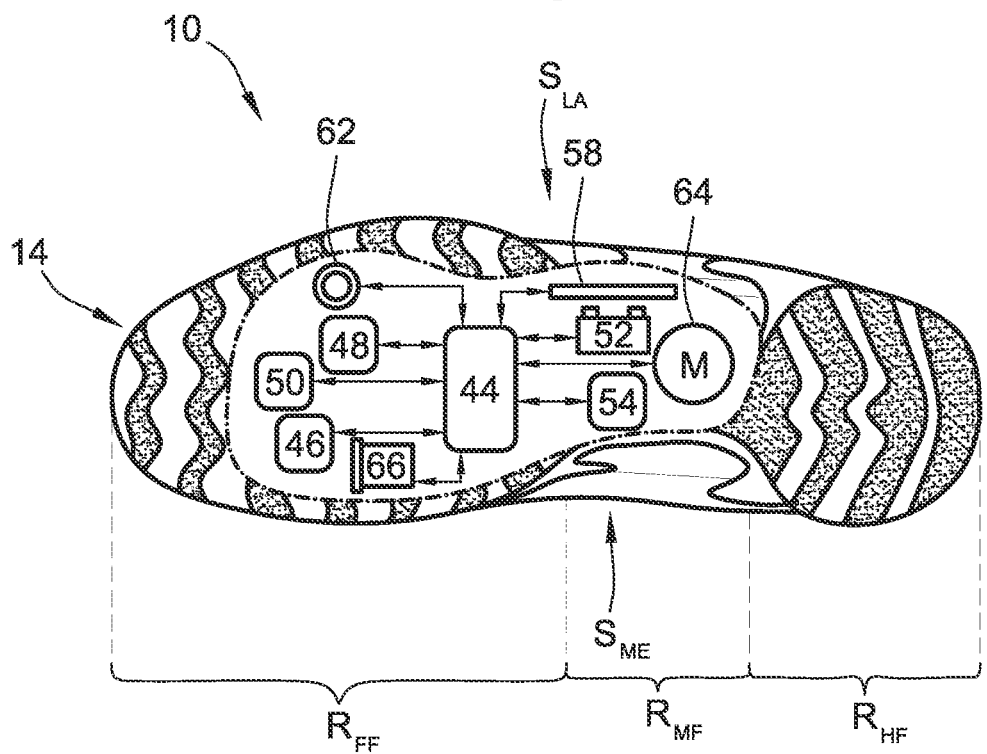
FIG. 2 is a partially schematic, bottom-view illustration of the representative intelligent electronic shoe of FIG. 1.
Figure 3:
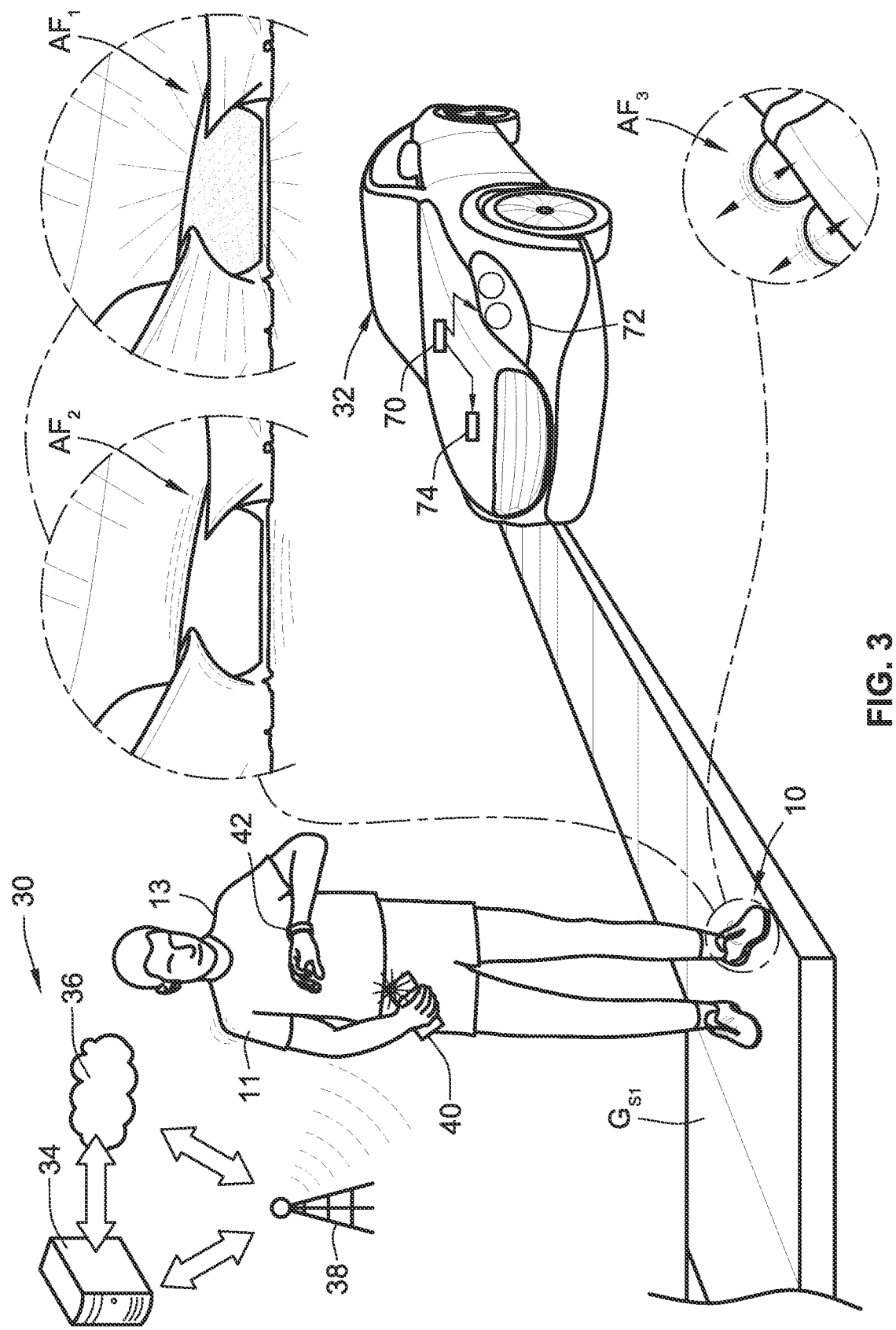
FIG. 3 is a partially schematic, perspective-view illustration of a representative user wearing a pair of the intelligent electronic shoes of FIGS. 1 and 2 during a wireless data exchange with a representative IES system to execute one or more automated footwear features.

The representative article of footwear 10 is generally depicted in FIGS. 1 and 2 as a bipartite construction that is primarily composed of a foot-receiving upper 12 mounted on top of a subjacent sole structure 14. For ease of reference, footwear 10 may be divided into three anatomical regions: a forefoot region $R_{FF}$, a midfoot region $R_{MF}$, and a hindfoot (heel) region $R_{HF}$, as shown in FIG. 2. Footwear 10 may also be divided along a vertical plane into a lateral segment $S_{LA}$—a distal half of the shoe 10 farthest from the sagittal plane of the human body—and a medial segment $S_{MF}$—a proximal half of the shoe 10 closest to the sagittal plane of the human body. In accordance with recognized anatomical classification, the forefoot region $R_{FF}$ is located at the front of the footwear 10 and generally corresponds with the phalanges (toes), metatarsals, and any interconnecting joints thereof. Interposed between the forefoot and hindfoot regions $R_{FF}$ and $R_{HF}$ is the midfoot region $R_{MF}$, which generally corresponds with the cuneiform, navicular and cuboid bones (i.e., the arch area of the foot). Heel region $R_{HF}$, in contrast, is located at the rear of the footwear 10 and generally corresponds with the talus and calcaneus bones. Both lateral and medial segments $S_{LA}$ and SME of the footwear 10 extend through all three anatomical regions $R_{FF}$, $R_{MF}$, $R_{HF}$, and each corresponds to a respective transverse side of the footwear 10. While only a single shoe 10 for a left foot of a user is shown in FIGS. 1 and 2, a mirrored, substantially identical counterpart for a right foot of a user may be provided, as shown in FIG. 3. Recognizably, the shape, size, material composition, and method of manufacture of the shoe 10 may be varied, singly or collectively, to accommodate practically any conventional or nonconventional application.

With reference to FIG. 1, the upper 12 is depicted as having a closed toe and heel configuration that is generally defined by three interconnected sections: a toe box 12A, which covers and protects the toes, a vamp 12B, which is aft of the toe box 12A and extends around the lace eyelets 16 and tongue 18, and a quarter 12C, which is aft of the vamp 12B and includes the rear and sides of the upper 12 that covers the heel. The upper 12 portion of the footwear 10 may be fabricated from any one or combination of a variety of materials, such as textiles, foams, polymers, natural and synthetic leathers, etc., that are stitched, adhesively bonded, or welded together to form an interior void for comfortably receiving a foot. The individual material elements of the upper 12 may be selected and located with respect to the footwear 10 in order to selectively impart properties of durability, air-permeability, wear-resistance, flexibility, and comfort, for example. An ankle opening 15 in the rear quarter 12C of the upper 12 provides access to the interior of the shoe 10. A shoelace 20, strap, buckle, or other conventional mechanism may be utilized to modify the girth of the upper 12 to more securely retain the foot within the interior of the shoe 10 as well as to facilitate entry and removal of the foot from the upper 12. Shoelace 20 may be threaded through a series of eyelets in the upper 12; the tongue 18 may extend between the lace 20 and the interior void of the upper 12.

Sole structure 14 is rigidly secured to the upper 12 such that the sole structure 14 extends between the upper 12 and a support surface upon which a user stands (e.g., ground surface $G_{S1}$ of FIG. 3). In effect, the sole structure 14 functions as an intermediate support platform that separates the user's foot from the ground. In addition to attenuating ground reaction forces and providing cushioning for the foot, sole structure 14 of FIG. 1 may provide traction, impart stability, and help to limit various foot motions, such as inadvertent foot inversion and eversion. In accordance with the illustrated example, the sole structure 14 is fabricated as a sandwich structure with a top-most insole 22, an intermediate midsole 24, and a bottom-most outsole 26. Insole 22 is shown located partially within the interior void of the footwear 10, firmly secured to a lower portion of the upper 12, such that the insole 22 is located adjacent a plantar surface of the foot. Underneath the insole 22 is a midsole 24 that incorporates one or more materials or embedded elements that enhance the comfort, performance, and/or ground-reaction-force attenuation properties of footwear 10. These elements and materials may include, individually or in any combination, a polymer foam material, such as polyurethane or ethylvinylacetate, filler materials, moderators, air-filled bladders, plates, lasting elements, or motion control members. Outsole 26, which may be absent in some configurations of footwear 10, is secured to a lower surface of the midsole 24. The outsole 26 may be formed from a rubber material that provides a durable and wear-resistant surface for engaging the ground. In addition, outsole 26 may also be textured to enhance the traction (i.e., friction) properties between footwear 10 and the underlying support surface.

FIG. 3 is a partially schematic illustration of an exemplary IES data network and communications system, designated generally as 30, for provisioning wireless data exchanges to execute one or more automated footwear features for a pair of intelligent electronic shoes 10 worn by a user or client 13. While illustrating a single user 13 communicating over the IES system 30 with a single motor vehicle 32, it is envisioned that any number of users may communicate with any number of motor vehicles or other remote computing nodes that are suitably equipped for wirelessly exchanging information and data. One or both IES 10 of FIG. 3 communicatively couple to a remote host system 34 or a cloud computing system 36 via a wireless communications network 38. Wireless data exchanges between the IES 10 and IES system 30 may be conducted directly, e.g., in configurations in which the IES 10 is equipped as a standalone device, or indirectly, e.g., by pairing and piggy backing the IES 10 onto a smartphone 40, smartwatch 42, wireless fidelity (WiFi) node, or other suitable device. In this regard, the IES 10 may communicate directly with the motor vehicle 32, e.g., via a short-range wireless communication device (e.g., a BLUETOOTH® unit or near field communications (NFC) transceiver), a dedicated short-range communications (DSRC) component, a radio antenna, etc. Only select components of the IES 10 and IES system 30 have been shown and will be described in detail herein. Nevertheless, the systems and devices discussed herein can include numerous additional and alternative features, and other available hardware and well-known peripheral components, for example, to carry out the various methods and functions disclosed herein.

With continuing reference to FIG. 3, the host system 34 may be implemented as a high-speed server computing device or a mainframe computer capable of handling bulk data processing, resource planning, and transaction processing. For instance, the host system 34 may operate as the host in a client-server interface for conducting any necessary data exchanges and communications with one or more "third party" servers to complete a particular transaction. The cloud computing system 36, on the other hand, may operate as middleware for IoT (Internet of Things), WoT (Web of Things), Internet of Adaptive Apparel and Footwear (Io-AAF), and/or M2M (machine-to-machine) services, connecting an assortment of heterogeneous electronic devices with a service-oriented architecture (SOA) via a data network. As an example, cloud computing system 36 may be implemented as a middleware node to provide different functions for dynamically onboarding heterogeneous devices, multiplexing data from each of these devices, and routing the data through reconfigurable processing logic for processing and transmission to one or more destination applications. Network 38 may be any available type of network, including a combination of public distributed computing networks (e.g., Internet) and secured private networks (e.g., local area network, wide area network, virtual private network). It may also include wireless and wireline transmission systems (e.g., satellite, cellular network, terrestrial networks, etc.). In at least some aspects, most if not all data transaction functions carried out by the IES 10 may be conducted over a wireless network, such as a wireless local area network (WLAN) or cellular data network, to ensure freedom of movement of the user 13 and IES 10.

Footwear 10 is equipped with an assortment of embedded electronic hardware to operate as a hands-free, rechargeable, and intelligent wearable electronic device. The various electronic components of the IES 10 are governed by one or more electronic controller devices, such as a resident footwear controller 44 (FIG. 2) that is packaged inside the sole structure 14 of footwear 10. The footwear controller 44 may comprise any one or various combinations of one or more of: a logic circuit, a dedicated control module, an electronic control unit, a processor, an application specific integrated circuit, or any suitable integrated circuit device, whether resident, remote or a combination of both. By way of example, the footwear controller 44 may include a plurality of microprocessors including a master processor, a slave processor, and a secondary or parallel processor. Controller 44, as used herein, may comprise any combination of hardware, software, and/or firmware disposed inside and/or outside of the shoe structure of the IES 10 that is configured to communicate with and/or control the transfer of data between the IES 10 and a bus, computer, processor, device, service, and/or network. The controller 44 is generally operable to execute any or all of the various computer program products, software, applications, algorithms, methods and/or other processes disclosed herein. Routines may be executed in real-time, continuously, systematically, sporadically and/or at regular intervals, for example, each 100 microseconds, 3.125, 6.25, 12.5, 25 and 100 milliseconds, etc., during ongoing use or operation of the controller 44.

Footwear controller 44 may include or may communicate with a resident or remote memory device, such as a resident footwear memory 46 that is packaged inside the sole structure 14 of footwear 10. Resident footwear memory 46 may comprise semiconductor memory, including volatile memory (e.g., a random-access memory (RAM) or multiple RAM) and non-volatile memory (e.g., read only memory (ROM) or an EEPROM), magnetic-disk storage media, optical storage media, flash memory, etc. Long-range communication capabilities with remote networked devices may be provided via one or more or all of a cellular network chipset/component, a satellite service chipset/component, or a wireless modem or chipset/component, all of which are collectively represented at 48 in FIG. 2. Close-range wireless connectivity may be provided via a BLUETOOTH® transceiver, an RFID tag, an NFC device, a DSRC component, or a radio antenna, all of which are collectively represented at 50. A resident power supply, such as a lithium-ion battery 52 with plug-in or cable-free (induction or resonance) rechargeable capabilities, may be embedded within upper 12 or sole structure 14 of the footwear 10. Wireless communications may be further facilitated through implementation of a BLUETOOTH Low Energy (BLE), category (CAT) M1 or CAT-NB1 wireless interface. The various communications devices described above may be configured to exchange data between devices as part of a systematic or periodic beacon message that is broadcast in a footwear-to-vehicle (F2V) information exchange, a footwear-to-everything (F2X) information exchange, e.g., footwear-to-infrastructure (F2I), footwear-to-pedestrian (F2P), or footwear-to-footwear (F2F).

Location and movement of the IES 10 and, thus, the user 13 may be tracked via a location tracking device 54, which can reside inside the sole structure 14 or the upper 12. Location can be determined through a satellite-based global positioning system (GPS), iBeacons, BLUETOOTH, WiFi, or other suitable navigation system. In an example, a GPS system may monitor the location of a person, a motor vehicle or other target object on earth using a collaborating group of orbiting GPS satellites the communicate with a suitable GPS transceiver to thereby generate, in real-time, a time-stamped series of data points. In addition to providing data relating to absolute latitudinal and absolute longitudinal position coordinates of a GPS receiver borne by a target object, data provided via the GPS system may be adapted and used to provide information regarding elapsed time during execution of a designated operation, a total distance moved, an elevation or altitude at a specific location, an elevation change within a designated window of time, a movement direction, a movement speed, and the like. Aggregated sets of the foregoing GPS data may be used by the resident footwear controller 44 to estimate a predicted route of the user 13. GPS system data, singly and collectively, may be used to supplement and optionally to calibrate accelerometer-based or other pedometer-based speed and distance data. To this end, information collected by the GPS satellite system may be used to generate correction factors and/or calibration parameters for use by the IES 10 to help ensure accurate sensor data and, thus, optimal system operation.

Even without a GPS receiver, the IES 10 can determine location and movement information through cooperation with a cellular system through a process known as "trilateration." A cellular system's towers and base stations communicate radio signals and are arranged into a network of cells. Cellular devices, such as IES 10, may be equipped with low-power transmitters for communicating with the nearest tower, base station, router, or access point. As a user moves with the IES 10, e.g., from one cell to another, the base stations monitor the strength of the transmitter's signal. When the IES 10 moves toward the edge of one cell, the transmitter signal strength diminishes for a current tower. At the same time, the base station in the approaching cell detects a strength increase in the signal. As the user moves into a new cell, the towers transfer the signal from one to the next. Resident footwear controller 44 can determine the location of the IES 10 based on measurements of the transmitter signals, such as the angle of approach to the cell tower(s), the respective time it takes for individual signals to travel to multiple towers, and the respective strength of each signal when it reaches a corresponding tower. According to other aspects of the present concepts, one or more movement sensing devices may be integrated into the shoe structure to determine dynamic movement (e.g., translation, rotation, velocity, acceleration, etc.) of the IES 10 with respect to an established datum or reference (e.g., position, spatial orientation, reaction, force, velocity, acceleration, electrical contact, etc.) about or along one or more axes.

With collective reference to FIGS. 1 and 2, article of footwear 10 may be equipped with a resident lighting system 56 with one or more lighting devices governed by footwear controller 44 to selectively illuminate the shoe structure and surrounding areas thereof. Different types of lighting devices may be employed by the lighting system 56, including light emitting diodes (LEDs), electroluminescent panels (ELP), compact florescent lamps (CFL), high intensity discharge lamps, flexible and inflexible organic LED displays, flat-panel liquid-crystal displays (LCD), as well as other available types of lighting elements. Any number of lighting devices may be disposed on any portion of shoe 10; as shown, a first lighting device 58 is packaged inside the sole structure 14, located within the midfoot region $R_{MF}$ of the footwear 10. First lighting device 58 is positioned immediately adjacent a window 60 (FIG. 1) that seals off a frame aperture extending through a peripheral wall of the sole structure 14 on the lateral side of the shoe 10. This lighting device 58 may be operated in an illuminated or "ON" state, a non-illuminated or "OFF" state, a series of illumination intensities (e.g., low, medium and high light outputs), an assortment of colors, and/or an assortment of illumination patterns. With this arrangement, the first lighting device 58 selectively illuminates a portion of upper 12, a portion of the sole 14, and a portion of the ground surface $G_{S1}$ adjacent the IES 10.

Figure 4:
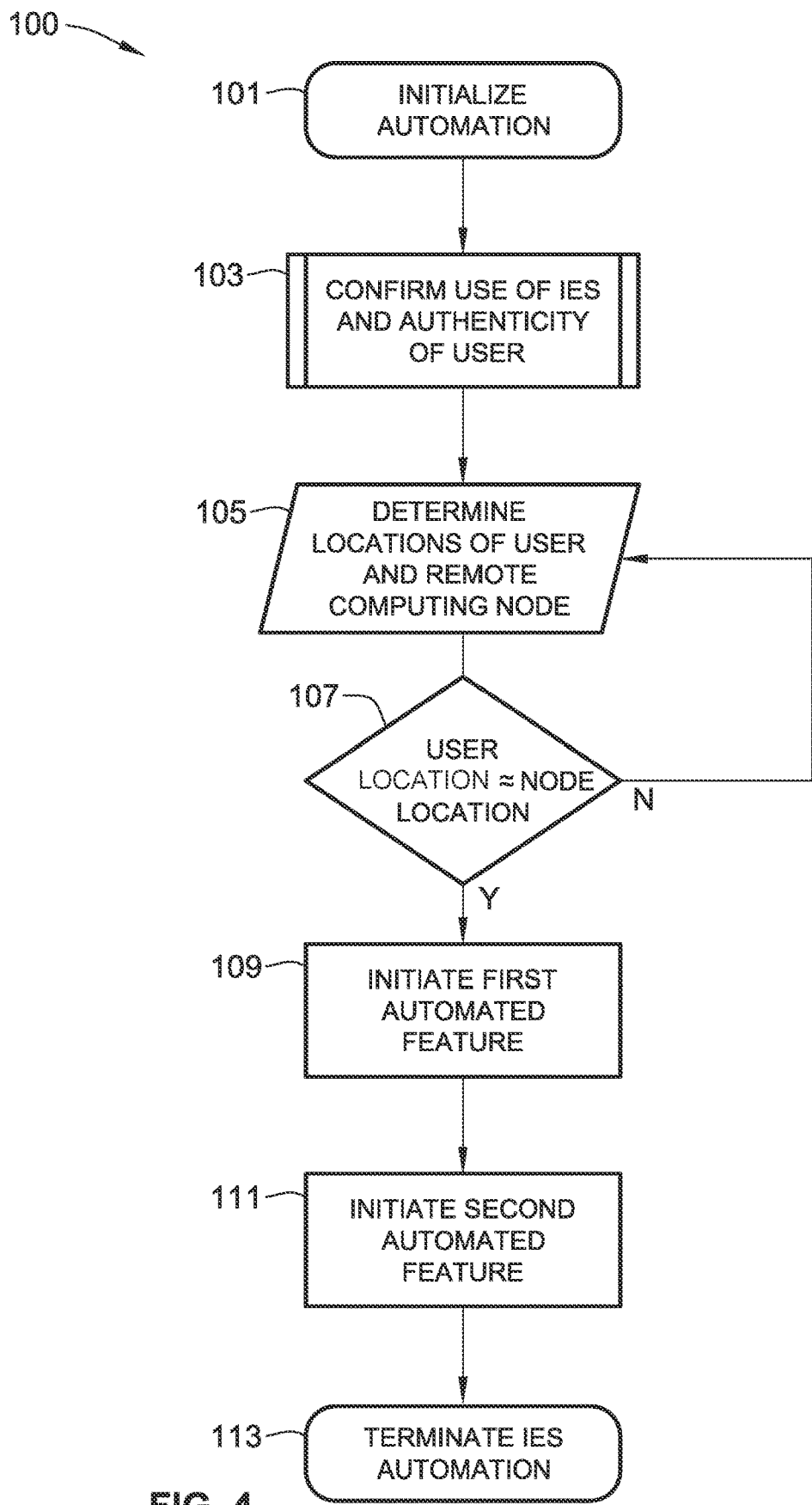
FIG. 4 is a flowchart for an automated footwear feature protocol that may correspond to memory-stored instructions executed by resident or remote control-logic circuitry, programmable controller, or other computer-based device or network of devices in accord with aspects of the disclosed concepts.

With reference now to the flow chart of FIG. 4, an improved method or control strategy for executing an automated feature, for example the footwear features illustrated in FIG. 3, for a wearable electronic device, such as IES 10 of FIGS. 1 and 2, is generally described at 100 in accordance with aspects of the present disclosure. Some or all of the operations illustrated in FIG. 4 and described in further detail below may be representative of an algorithm that corresponds to processor-executable instructions that may be stored, for example, in main or auxiliary or remote memory, and executed, for example, by a resident or remote controller, central processing unit (CPU), control logic circuit, or other module or device, to perform any or all of the above or below described functions associated with the disclosed concepts. It should be recognized that the order of execution of the illustrated operation blocks may be changed, additional blocks may be added, and some of the blocks described may be modified, combined, or eliminated.

Method 100 begins at terminal block 101 with processor-executable instructions for a programmable controller or control module or similarly suitable processor, such as resident footwear controller 44 or FIG. 2, to call up an initialization procedure for a protocol to govern operation of a wearable electronic device, such as IES 10 of FIG. 1. This routine may be called-up and executed in real-time, continuously, systematically, sporadically, and/or at regular intervals, etc., during use of the intelligent electronic shoe 10. With reference to the IES data network and communications system 30 architecture of FIG. 3, as a representative implementation of the methodology set forth in FIG. 4, the initialization procedure at block 101 may be commenced each time the user 13 activates a ride-sharing software application through the smartphone 40 or smartwatch 42, or each time the user 13 is paired with a rideshare driver/vehicle 32 through the ride-sharing software application. Utilizing a dedicated mobile application or a web-based applet operating on one of the aforementioned portable computing devices, the ride-seeking client 13 is paired with a rideshare driver (e.g., the operator of motor vehicle 32) that is registered with a rideshare server system (e.g., UBER®, LYFT®, etc., represented by cloud computing system 36). The illustrated example portrays a single rider—a private individual—receiving transportation from a single prospective driver—another private individual—in the driver's privately-owned automobile. However, it is envisioned that the IES system 30 include any number of prospective riders seeking rides from any number of registered drivers operating any logically relevant type of motor vehicle. In this regard, the fleet of available drivers may be comprised of private individuals, salaried or contract employees, public transit, private car or taxi service, autonomous vehicles, or any combination thereof.

To enhance security, a transaction between the IES 10 and IES system 30 can be enabled by an authentication process at predefined process block 103. Authentication may be performed by a primary or secondary source that confirms proper activation of a wearable electronic device and/or a valid identity of the device's user. Upon manual entry of user identification information, such as a password, PIN number, credit card number, personal information, biometric data, predefined key sequences, etc., the user may be permitted to access a personal account, e.g., a "digital locker" operating on the user's smartphone 40 with a NIKE+® Connect software application and registered with the IoAAF middleware node. Thus, a transaction can be enabled by, for example, a combination of personal identification input (e.g., mother's maiden name, social security number, etc.) with a secret PIN number (e.g., six or eight-digit code), or a combination of a password (e.g., created by the user 13) and a corresponding PIN number (e.g., issued by the host system 34), or a combination of a credit card input with secret PIN number. Additionally, or alternatively, a barcode, RFID tag, or NFC tag may be imprinted on or attached to the IES 10 shoe structure, and configured to communicate a security authentication code to the IES system 30. Other established authentication and security techniques, including blockchain cryptographic technology, can be utilized to prevent unauthorized access to a user's account, for example, to minimize an impact of unsanctioned access to a user's account, or to prevent unauthorized access to personal information or funds accessible via a user's account.

As an alternative or supplemental option to manually entering identification information at predefined process block 103, security authentication of the user 13 may be automated by the resident footwear controller 44. By way of non-limiting example, a pressure sensor 62, which may be in the nature of a binary contact-type sensor switch, may be attached to the footwear 10 (e.g., embedded within the midsole 24 of the sole structure 14). This pressure sensor 62 detects a calibrated minimum load on the insole 22 and thereby establishes the presence of a foot in the upper 12. Any future automated features of the IES 10 may first require the controller 44 confirm, via command prompt to the binary pressure sensor 62, that a foot is present in the upper 12 and, thus, the footwear 10 is in use before transmitting a command signal to initiate an automated operation. While only a single sensor is illustrated in FIG. 2, it is envisioned that the IES 10 may be equipped with a distributed array of sensors, including pressure, temperature, moisture, and/or shoe dynamics sensors, packaged at discrete locations throughout the shoe structure. In the same vein, foot presence sensing (FPS) may be determined via a variety of available sensing technologies, including capacitance, magnetic, etc. Additional information regarding foot presence sensing can be found, for example, in U.S. Patent Application Publication Nos. 2017/0265584 A1 and 2017/0265594 A1, to Steven H. Walker, et al., both of which are incorporated herein by reference in their respective entireties and for all purposes.

In addition to functioning as a binary (ON/OFF) switch, the pressure sensor 62 may take on a multi-modal sensor configuration (e.g., a polyurethane dielectric capacitive biofeedback sensor) that detects any of assorted biometric parameters, such as the magnitude of an applied pressure generated by a foot in the upper 12, and outputs one or more signals indicative thereof. These sensor signals may be passed from the pressure sensor 62 to the resident footwear controller 44, which then aggregates, filters, and processes the received data to calculate a current user weight. The calculated current user weight for the individual presently using the IES 10 is compared to a previously validated, memory-stored user weight (e.g., authenticated to a registered user of an existing personal account). In so doing, the footwear controller 44 is able to determine if the current user weight is equal to or within a predetermined threshold range of the validated user weight. Once the current user is authenticated to the validated user based on this weight comparison, the resident footwear controller 44 is enabled to transmit command signals to one or more subsystems within the footwear 10 to automate a feature thereof.

Automated security authentication of a user may be achieved through other available techniques, as part of predefined process block 103, including cross-referencing characteristics of a current user's foot with previously validated characteristics of an authenticated user's foot. For instance, the representative IES 10 of FIG. 2 is shown fabricated with a motorized lacing system utilizing a lace motor (M) 64 that is mounted to the footwear 10 and is selectively actuable to transition the shoelace 20 back-and-forth between an untensioned (loosened) state and one or more tensioned (tightened) states. Lace motor 64 may be in the nature of a two-way DC electric worm-gear motor that is housed inside the sole structure 14 and controlled by the resident footwear controller 44. Activation of the lace motor 64 may be initiated via a manually-activated switch built into the shoe structure or softkey activation through an app on the user's smartphone 40 or smartwatch 42. Alternatively, motor control may be automated via the resident footwear controller 44, for example, in response to a sensor signal from pressure sensor 62 indicating that a foot has been placed inside the upper 12. Shoelace tension may be actively modulated through governed operation of the lace motor 64 by the controller 44 during use of the IES 10, e.g., to better retain the foot in response to dynamic user movement. The foregoing functions, as well as any other logically relevant option or feature disclosed herein, may be applied to alternative types of wearable apparel, including but not limited to clothing, headgear, eyewear, wrist wear, neck wear, leg wear, undergarments, and the like. Moreover, the lace motor 64 may be adapted to automate the tensioning and loosening of straps, latches, cables and other commercially available mechanisms for fastening shoes.

Similar to the pressure sensor 62 discussed above, the lace motor 64 may double as a binary (ON/OFF) switch that effectively enables and disables automated features of the IES 10. That is, the resident footwear controller 44, prior to executing an automated feature, may communicate with the lace motor 64 to determine whether the shoelace 20 is in a tensioned or untensioned state. If the latter, all automated features may be disabled by the resident footwear controller 44 to prevent the inadvertent initiation of an automated feature while the IES 10 is not in use, for example. Conversely, upon determination that the lace 20 is in the tensioned state, the footwear controller 44 is permitted to transmit automation command signals.

During operation of the lace motor 64, the shoelace 20 may be placed in any one of multiple discrete, tensioned positions to accommodate feet with differing girths or users with different tension preferences. A lace sensor, which may be built into the motor 64 or packaged in the sole structure 14 or upper 12, may be employed to detect a current tensioned position of the lace 20 for a given user. Alternatively, real-time tracking of a position of an output shaft (e.g., a worm gear) of the two-way electric lace motor 64 or a position of a designated section of the lace 20 (e.g., a lace spool mated with the motor's worm gear) may be used to determine lace position. Upon tensioning of the lace 20, the resident footwear controller 44 communicates with the lace motor 64 and/or lace sensor to identify a current tensioned position of the lace 20 for a current user. This current tensioned position is compared to a previously validated, memory-stored lace tensioned position (e.g., authenticated to a registered user of an existing personal account). Through this comparison, the footwear controller 44 can determine if the current tensioned position is equal to or within a predetermined threshold range of the validated tensioned position. After authenticating the current user to the validated user, command signals may be transmitted via the resident footwear controller 44 to one or more subsystems within the footwear 10 to automate a feature thereof.

Upon completion of the authentication procedure set forth in predefined process block 103, the method 100 of FIG. 4 proceeds to input/output block 105 with processor-executable instructions to retrieve sufficient data to identify respective locations of a wearable electronic device and a remote computing node with which it is communicating. In accord with the illustrated example of FIG. 3, the IES 10 may receive, either directly or through cooperative operation with the smartphone 40 or smartwatch 42, location data from the remote host system 34 and/or cloud computing system 36 that is indicative of a current location of the user 13 and a current location of the motor vehicle 32. User location can also, or alternatively, be tracked through a rideshare app or a route planning app running on the user's smartphone 40. Location and movement of the IES 10 and, thus, the user 13 can also be determined, for example, through a satellite-based GPS navigation system transceiver built into the upper 12 or sole structure 14. When paired, and the matched driver is in route, a back office intermediary server, such as cloud computing system 36 operating as a middleware node, tracks in real-time the location of the vehicle 32, e.g., either through an on-board transmission device or through an app on the driver's personal computing device.

The method 100 of FIG. 4 continues to decision block 107 to determine whether the wearable electronic device and user's joint location is within a predetermined location or a predetermined proximity to the node's location. Continuing with the above example, the user's smartphone 40 or smartwatch 42 may display the real-time locations of the IES 10 and vehicle 32 on a map using a distinct graphic for each party (e.g., using a corresponding graphical pin, symbol, avatar, animation, etc.), as well as movement of the IES 10 relative to the motor vehicle 32, for example, via placement and movement of these graphics. Concomitantly, the IES 10 and/or IES system 30 may monitor a current proximity (e.g., number of feet, number of miles, number of minutes, etc.) of the IES 10 from the current location of the vehicle 32. Optional arrangements can limit the determination of decision block 107 to a user-selected or system-designated proximity (e.g., within 100 feet or less) and/or within a user-selected or system-designated location (e.g., a designated rideshare pickup location, a user-selected parking lot, etc.). As yet another option, the predetermined location may include a virtual perimeter or "geofence" that is dynamically generated by the resident footwear controller 44. In this latter instance, the IES 10 and/or IES system 30 detects when a location-aware device of the vehicle 32 breaches the geofence. Upon determining that the user's and vehicle's current locations are not within the predetermined proximity/location of each other (Block 107=NO), the method 100 may return to input/output block 105. In that regard, location tracking at block 105 and proximity assessment at block 107 may be executed in a continuous loop until a positive determination is returned.

In response to the node's and/or user's determined location entering the predetermined location, or the node's location coming within proximity to the user's determined location (Block 107=YES), or both, one or more command signals are transmitted to one or more subsystems to execute one or more automated features of a wearable electronic device. As generally indicated at process block 109, for example, a first command signal is transmitted to a first subsystem to execute a first automated feature $AF_1$ of an intelligent electronic shoe. According to the illustrated example of FIG. 3, resident footwear controller 44 may confirm that the motor vehicle 32 is now within 100 ft or other pre-designated distance of the IES 10 and, thus, the user 13 is in plain sight of the vehicle driver. Resident footwear controller 44 automatically responds to this determination (i.e., without any user or external system prompt) by transmitting a command signal to resident lighting system 56 to activate lighting device 58 to thereby generate a predetermined light output. This predetermined light output may include a personalized color (e.g., aqua for a rider with UBER®, pink for a rider with LYFT®, green, blue and green for BLABLACAR®, etc.) or a corresponding blinking pattern (e.g., strobing, user-specific or driver-specific blinking pattern, selected script in Morse Code, etc.). In at least some implementations, the selected color and/or pattern is detectable by a digital camera with an optical sensor on the motor vehicle 32. Once detected, a resident vehicle controller or the ridesharing app on the driver's smartphone can evaluate the personalized color/pattern to verify the waiting user 13 of the IES 10 corresponds to the user's current ride-share request. As an option, the system may employ light-based wireless optical authentication, e.g., using LiFi (short for "light fidelity"), to transmit user authentication data.

It is envisioned that any of the disclosed connected wearable electronic devices may automate additional or alternative features as part of the methodology 100 set forth in FIG. 4. Responsive to the node's determined location being within the predetermined location or coming within the predetermined proximity to the user's determined location (Block 107=YES), a second command signal may be transmitted to a second subsystem to execute a second automated feature $AF_2$ of the wearable electronic device, as indicated at process block 111. As a non-limiting example, the IES 10 of FIG. 2 is shown equipped with a haptic transducer 66 that is housed inside the sole structure 14 in operative communication to the insole 22. To alert the user 13 of IES 10 that the rideshare vehicle 32 has reached the predetermined location and/or is within proximity to the user's current location, the resident footwear controller 44 emits a command signal to the haptic transducer 66 to generate a haptic cue (e.g., a perceptible vibration force or a series of vibration pulses) that is transmitted from the midsole 24, through the insole 22, and to the user's foot. Operation of the haptic transducer 66 may be coordinated with the output of the vehicle 32.

An optional third automated feature $AF_3$ may include operating the lace motor 64 as a haptic force-feedback device that is selectively activated by the footwear controller 44 to rapidly tension and release the shoelace 20. Audible, visual or haptic feedback from the IES 10 may be employed to notify the wearer of interactions with other computing devices, such as light system or haptic system feedback to alert the user to an incoming call on their personal smartphone. Likewise, the IES 10 may operate in conjunction with the smartphone 40 (e.g., coordinated flashing of an LED camera light or an eccentric rotating mass (ERM) actuator) or an active apparel element 11 (e.g., coordinated activation of a built-in tactile or haptic device in the user's shirt), as illustrated in FIG. 3. As yet another option, haptic feedback can be utilized to provide turn-by-turn directions to the user (e.g., left foot or right foot vibrates at a heightened intensity and/or with a designated pulse pattern to indicate a left turn or right turn). In the same vein, haptic feedback can be employed in a similar fashion to direct a user along a pre-selected route or to warn a user against taking a particular route (e.g., deemed unsafe). Additional information regarding footwear and apparel with haptic feedback can be found, for example, in U.S. Patent Application Publication No. 2017/0154505 A1, to Ernest Kim, which is incorporated herein by reference in its entirety and for all purposes.

Optionally, the IES 10 may be provided with an audio system, which is represented in FIG. 1 by a miniaturized audio speaker 68 that is attached to the rear quarter 12C of the upper 12. Resident footwear controller 44, upon confirming that the user and/or node are within the predetermined location or are within proximity to each other, automatically transmits a command signal to the audio system speaker 68 to generate a predetermined sound output. As another option, the lace motor 64 may repeatedly tighten/loosen the shoelace 20 as a signal/cue, e.g., of an arriving pickup, a check in, a connection, etc. In yet another option, the IES 10 may be used by a user to locate, self-authenticate and access an autonomous vehicle or vehicle lease. The method 100 may then terminate at terminal block 113 and/or loop back to terminal block 101.

In addition to automating features of adaptive apparel and footwear, disclosed wearable electronic devices may automate features on a remote computing node. Referring once again to the representative implementation illustrated in FIG. 3, resident footwear controller 44 may respond to the user's/node's current location being within the predetermined location or within proximity to each other by emitting a command signal to an in-vehicle control unit 70 of the motor vehicle 32 with instructions to generate an audible or visual output that will facilitate the rideshare interaction between the rider and driver. These instructions may cause one or both vehicle headlamps 72 to illuminate, flash, increase the intensity of light output, or a combination thereof, such that the motor vehicle 32 is more readily perceptible to the user 13. As an optional application, the resident footwear controller 44 may coordinate the light output of the vehicle headlamps 72 with the light output of the IES light system 56, e.g., such that they illuminate and/or flash in unison. In addition, or alternatively, command signals received from the footwear controller 44 via in-vehicle control unit 70 may cause activation and/or modulation of the vehicle's horn system 74 or other in-vehicle audio system.

Another optional feature may be a "dance party" mode wherein a musical interlude output by any of the vehicle's audio components, accompanied by a light show output by any of the vehicle's light systems, may be triggered via the IES 10. Sound (audio/music) output from the motor vehicle 32 may be linked to one or more features and subsystems of the IES 10. Coordinated activation of the shoelace motor 64, lighting device 58, and/or haptic transducer 66 may be provided to sync automation of the IES 10 with sound and/or light output from the vehicle 32. Audio output of the user's personal electronic device(s), such as smartphone 40 or smartwatch 42, can also be synced in a similar manner Footwear-to-vehicle communications can also be employed to allow the IES 10, after verifying security authentication of the current user, to lock or unlock a vehicle door or provide access to a vehicle trunk compartment. In the same vein, an authenticated user may use their IES 10 as an electronic key fob to start a vehicle or automate one or more preset driver settings, such as a desired seat position, a desired steering wheel position, desired mirror positions, etc.

Footwear-to-infrastructure communications may be enabled to allow the IES 10 to communicate with a networked "smart city" controller that, in turn, can modulate street lighting or traffic light changes to improve safety for a walker or runner. Conversely, the "smart city" controller may communicate with the IES 10 to warn the user they are coming up to a pedestrian crossing with a "Do Not Walk" sign signaling that pedestrians must yield the right of way to oncoming vehicles. Light features built into the shoe may also be used during an athletic event (e.g., coordinated to match the colors of a user's favorite athletic team) or while exercising (e.g., to light roadway while running at night). Security features may also be installed to render the IES unusable to a non-authenticated party. For instance, the lace motor 64 may be rendered inoperable by the footwear controller 44 upon determining that the person wearing the IES 10 is an unauthorized user. In tandem, the controller 44 may transmit an electronic alert to the user's smartphone 40 or smartwatch 42 notifying them of the potential theft or misuse of the IES 10.

Optional configurations may provide intelligent electronic footwear or apparel that is adapted for instructional purposes. As an example, a user or instructor can wear the IES 10 when helping to teach a person how to drive an automobile. For instance, the IES 10 may be configured such that an instructor can press their feet, through the shoe, hard to a passenger compartment floor panel to simulate depressing a brake pedal. A built-in pressure sensor 62 detects the instructor's foot gesture, outputs a corresponding signal to the footwear controller 44, and the IES 10 communicates with the vehicle 32 brake control module (BCM) to activate the vehicle brakes. In addition, or alternatively, the IES 10 may communicate with a pair of intelligent electronic shoes worn by the student, transmitting instructions to provide sensory feedback to the student that they should be using their foot to physically depress the brake pedal and thereby apply the vehicle's brake system. In addition to teaching a student how to drive, haptic, auditory and/or visual feedback from the IES 10 may be employed to teach a wearer of the footwear a series of steps in a dance routine, proper transfer of body weight when swinging a golf club or baseball bat, proper timing, gait, and step count for executing hurdles, etc.

Figure 5:
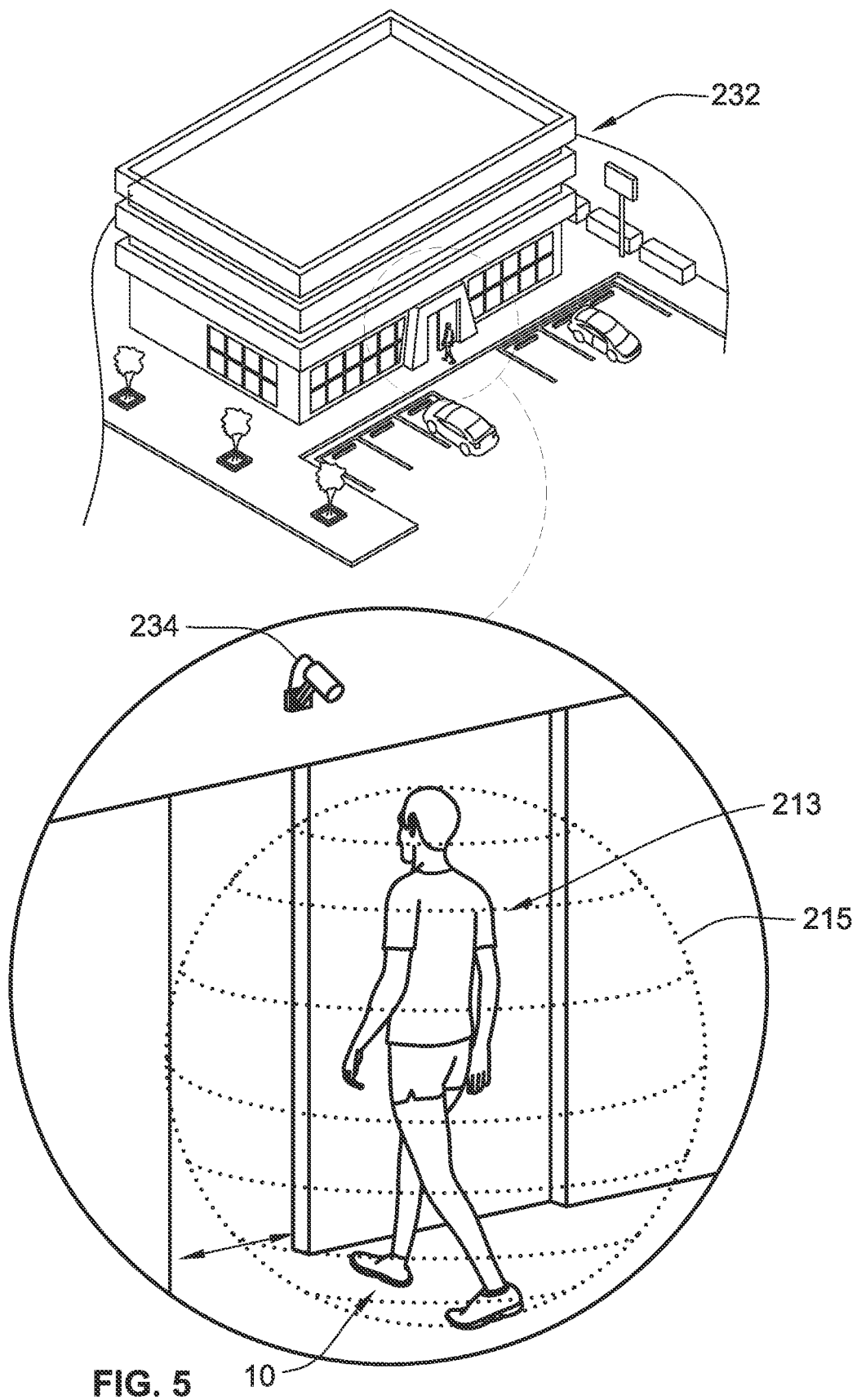
FIG. 5 is a perspective-view illustration of a representative user employing a pair of the intelligent electronic shoes of FIGS. 1 and 2 to automate deactivation of a security system to enter a representative building in accordance with aspects of the present disclosure.

In addition to facilitating data exchanges between a wearable electronic device and a motor vehicle, many of the disclosed concepts are similarly applicable to non-ridesharing and non-automotive applications. For instance, the remote computing node may take on alternative forms from those described above, such as a central server computer or a parallel HMI of a residential or commercial security system. When the user 13 of the IES 10 enters a predetermined location (e.g., an entry way, a hallway, a room, etc.) or is within a pre-selected proximity of the facility being monitored (e.g., delineated by an active geofence), the resident footwear controller 44 of FIG. 2 may transmit a deactivation command signal to the security system server computer or HMI such that the user 13 may enter the facility without having to manually deactivate the security system. In FIG. 5, for example, a representative user 213 is shown approaching the front entrance of a building 232 that is secured by a commercial security system (represented by a non-contact, video-monitored entry panel 234). One or both of the IES 10 worn by the user 213 emits an invisible geofence 215 that encircles the user 213. Once the user 213 is sufficiently close to the building 232 for the video-monitored entry panel 234 to breach or otherwise penetrate the IES-generated geofence 215, the IES 10 automatically transmits a security authentication signal to the security system entry panel 234 whereby the user 213 is granted access to the building 232 (portrayed by the automated opening of the left-most security door at the entrance of the building 232). Alternative system configurations may use other communication means, including any of those described above and below, to facilitate interaction between the IES 10 and security system 234.

Figure 6:
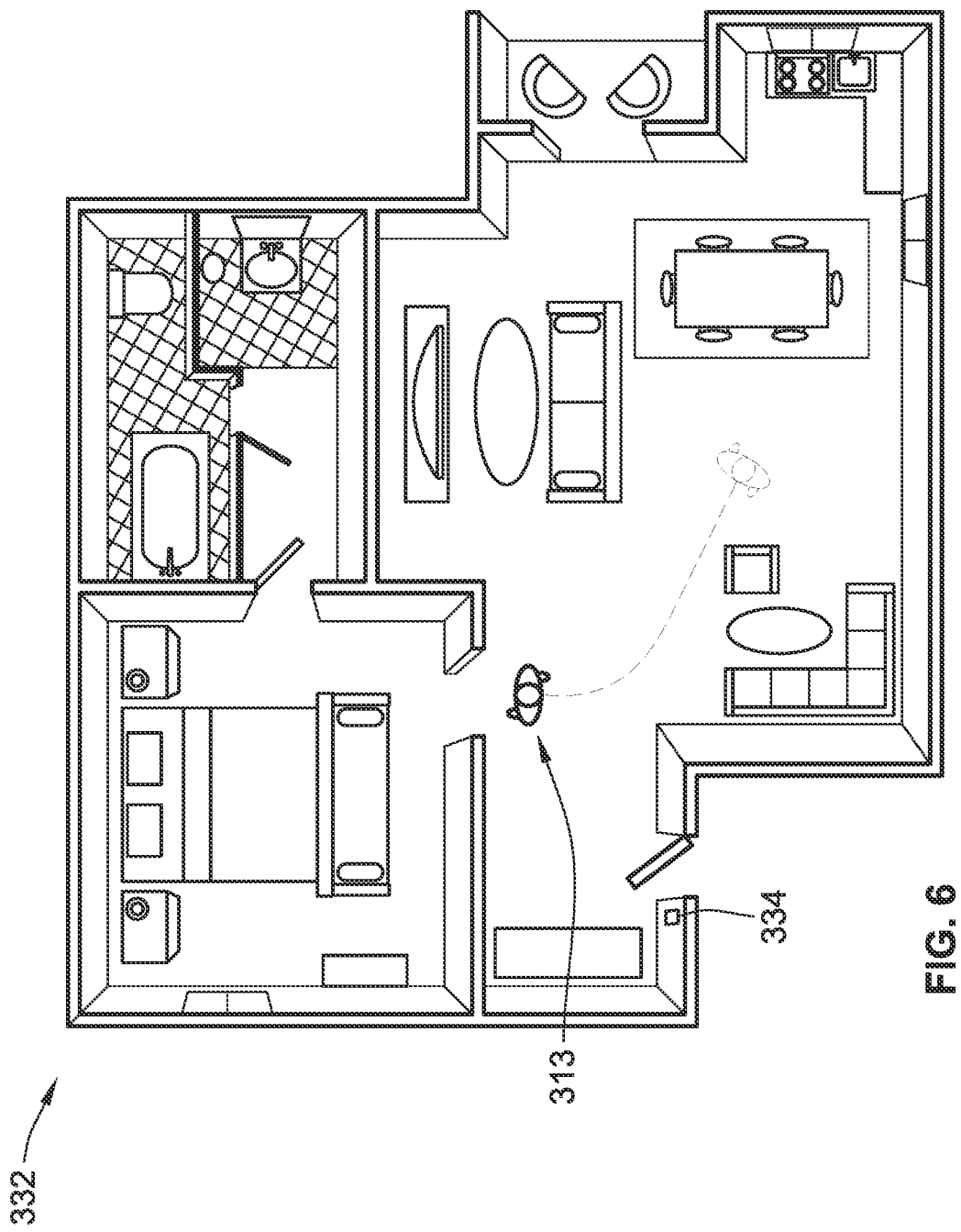
FIG. 6 is a plan-view illustration of a representative user employing a pair of the intelligent electronic shoes of FIGS. 1 and 2 to automate activation or deactivation of one or more subsystems governed by a home automation system in accordance with aspects of the present disclosure.

As yet a further example, the remote computing node may be in the nature of a home automation system (or "smart home") that controls the climate, lighting, blinds, appliances, etc., of the user's home. When a user of the IES 10 enters or exits a predetermined location (e.g., a front door, a garage, a hallway, a room, etc.) or enters or exits a pre-selected proximity of the residence being regulated by the home automation system, the resident footwear controller 44 may transmit any one or more command signals to the home automation system to lock or unlock a door, activate or deactivate a room light, increase or decrease a temperature of a thermostat, or a combination of the foregoing features. In FIG. 6, for example, a representative user 313 is shown wandering around a home 332 with various appliances and devices and subsystems that are controlled, in whole or in part, by a residential home automation system (represented by a WiFi-enabled touchscreen gateway panel 334). Responsive to the user 313 moving from a first room to a second room (e.g., walking from the living room into the bedroom), the IES 10 may automatically transmit a series of command signals to: (1) illuminate the lights in the second room; (2) darken the lights in the first room; (3) switch off one or more devices (e.g., television) in the first room; and (4) modulate the temperature in the second room.

IES 10 of FIG. 2 may be considered particularly useful for interacting with a fully assisted or a fully autonomous motor vehicle, such as those classified as Society of Automotive Engineers (SAE) Levels 3, 4 or 5 vehicles. In addition to enabling controller-authenticated and automated locking, unlocking, and motor start of a vehicle, the IES 10 may communicate with a powertrain control module (PCM) or a route planning module (RPM) to automatically coordinate transporting the user 13 of the IES 10 to a predetermined location. In a specific example, motor vehicle 32 of FIG. 3 may propagate a unique geofence signal in order to pair with multiple users wearing compatible IES. If user 13 is within the boundary of the vehicle's geofence, the IES 10 responds by automatically generating a first visual, audible and/or haptic output to notify the user 13 they have breached the geofence. The user 13 may then initiate a dedicated mobile app operating on their smartphone 40 to identify a current real-time location of the motor vehicle 32, which may be displayed on a GPS or navigation map application. When the user 13 is within close proximity of the motor vehicle 32 (e.g., ten (10) meters or less), the IES 10 may generate a second visual, audible and/or haptic output to notify the user 13 they are within a predetermined proximity to the vehicle 32 and, thus, should be able to visually identify the vehicle 32.

Once the user 13 locates the motor vehicle 32, a two-way authentication process will take place between the resident footwear controller 44 of the IES 10 and a central electronic control unit (ECU) of the motor vehicle 32 or a server computer of a backend of middleware node facilitating the F2V operation. Once verified, the motor vehicle 32 will signal to the user 13 that they have the option to enter the vehicle's passenger compartment. A validation key may concomitantly issue to the user 13 via the IoAAF system; user 13 can retrieve the key via the aforementioned smartphone app. If the user 13 elects to enter the motor vehicle 32, the user 13 may be taken to a specified or unspecified location (an "Unlock Location") where a reserved product is waiting for the user 13. Once the user 13 arrives at the Unlock Location, the user 13 may be required to input the validation key to access to the reserved product.

Aspects of this disclosure may be implemented, in some embodiments, through a computer-executable program of instructions, such as program modules, generally referred to as software applications or application programs executed by any of the controller or controller variations described herein. Software may include, in non-limiting examples, routines, programs, objects, components, and data structures that perform particular tasks or implement particular data types. The software may form an interface to allow a computer to react according to a source of input. The software may also cooperate with other code segments to initiate a variety of tasks in response to data received in conjunction with the source of the received data. The software may be stored on any of a variety of memory media, such as CD-ROM, magnetic disk, and semiconductor memory (e.g., various types of RAM or ROM).

Moreover, aspects of the present disclosure may be practiced with a variety of computer-system and computer-network configurations, including multiprocessor systems, microprocessor-based or programmable-consumer electronics, minicomputers, mainframe computers, and the like. In addition, aspects of the present disclosure may be practiced in distributed-computing environments where tasks are performed by remote-processing devices that are linked through a communications network. In a distributed-computing environment, program modules may be located in both local and remote computer-storage media including memory storage devices. Aspects of the present disclosure may therefore be implemented in connection with various hardware, software or a combination thereof, in a computer system or other processing system.

Any of the methods described herein may include machine readable instructions for execution by: (a) a processor, (b) a controller, and/or (c) any other suitable processing device. Any algorithm, software, protocol or method disclosed herein may be embodied in software stored on a tangible medium such as, for example, a flash memory, a solid-state drive (SSD) memory, a hard disk drive (HDD) memory, a CD-ROM, a digital versatile disk (DVD), or other memory devices, but persons of ordinary skill will readily appreciate that the entire algorithm and/or parts thereof could alternatively be executed by a device other than a controller and/or embodied in firmware or dedicated hardware in a known manner (e.g., implemented by an application specific integrated circuit (ASIC), a programmable logic device (PLD), a field programmable logic device (FPLD), discrete logic, etc.). Further, although specific algorithms are described with reference to flowcharts depicted herein, persons of ordinary skill will readily appreciate that many other methods of implementing the example machine readable instructions may alternatively be used.

The following exemplary features and configurations are not intended to represent every embodiment or every aspect of the present disclosure. Rather, many of the features and advantages of the present disclosure will become more readily apparent from the following representative examples. In this regard, each of the disclosed systems, methods, devices, protocols, etc., including those illustrated in the figures, may comprise any of the features, options, and alternatives described herein with respect to the other embodiments, singly and in any combination, unless explicitly disclaimed or logically prohibited.

Aspects of the present disclosure are directed to intelligent electronic shoe systems for a foot of a user. The IES system includes an upper configured to attach to the foot of the user, and a sole structure attached to the upper and configured to support thereon the foot of the user. The sole structure has an outsole that defines the ground-engaging portion of the IES. A light system, which is mounted to the sole structure and/or the upper, is configured to generate light in response to a command signal. A wireless communications device is configured to wirelessly communicate with a remote computing node. The IES system also includes a resident or remote footwear controller that is operatively connected to the wireless communications device and the light system. The footwear controller is configured to: receive one or more location data sets indicative of a user location of the user and a node location of the remote computing node. The footwear controller determines whether the user location is within a predetermined location or proximity to the node location. Responsive to the user location being within the predetermined location or proximity to the node location, the controller transmits a command signal to the light system to generate a predetermined light output.

For any of the disclosed IES systems, the footwear controller may be further configured to transmit a second command signal to a control system of the remote computing node to generate an audible or visual output, e.g., in response to the user location being within the predetermined location/proximity to the node location. The remote computing node may be a motor vehicle with a vehicle headlamp system. In this instance, the visual output may include illumination, flashing and/or intensification of a light output of the vehicle headlamp system. The audible output of the vehicle may include activation and/or modulation of an audible output of the vehicle's horn system. The footwear controller may be further configured to coordinate the light output of the vehicle headlamp system with the predetermined light output of the IES light system.

For any of the disclosed IES systems, the wireless communications device of the IES system is further configured to wirelessly connect to the portable electronic device and thereby wirelessly communicate with the remote computing node. The IES system may comprise a haptic transducer that is attached to the sole structure and/or the upper. The footwear controller may transmit a third command signal to the haptic transducer to generate a haptic cue, e.g., in response to the user's location being within the predetermined location/proximity to the node's location. As another option, the IES system may include an audio system that is attached to the sole structure and/or the upper. The footwear controller may transmit a fourth command signal to the audio system to generate a predetermined sound output, e.g., in response to the user's location being within the predetermined location/proximity to the node's location.

For any of the disclosed IES systems, the remote computing node may be a security system; in this instance, the footwear controller may transmit a deactivation command signal to the security system, e.g., responsive to the user location being within the predetermined location or proximity to the node location. Optionally, the remote computing node may be a home automation system; in this instance, the footwear controller may transmit a fifth command signal to the home automation system to lock or unlock a door, activate or deactivate a room light, and/or increase or decrease a temperature of a thermostat, e.g., when the user's location is within the predetermined location or proximity to the node's location.

For any of the disclosed IES systems, the predetermined location may include a geofence that is defined by the footwear controller. The command signal for activating the light system may be transmitted upon detection of the remote computing node breaching the geofence. The IES system may further comprise a pressure sensor that is mounted to the sole structure or upper; the pressure sensor is configured to detect a presence (or absence) of the foot in the upper. In this instance, the command signal for activating the IES light system is transmitted, at least in part, as a response to the detected presence of the foot in the upper. The pressure sensor may also (or alternatively) be configured to detect the user's weight. In this instance, the footwear controller may receive a sensor signal from the pressure sensor that is indicative of the user's detected weight, determine if the detected weight is within a predetermine range of a memory-stored validated user weight, and transmit the command signal to the IES light system only if the detected weight is within the predetermine range of the validated user weight.

For any of the disclosed IES systems, a shoelace is attached to the upper, and a lace motor is mounted inside the sole structure and configured to selectively transition the shoelace between tensioned and untensioned states. The footwear controller may communicate with the lace motor to determine whether the shoelace is in the tensioned or untensioned state. The command signal for activating the IES light system is transmitted further in response to the shoelace being in the tensioned state. For some applications, the tensioned state includes multiple discrete tensioned positions; the IES system may include a lace sensor that detects a current one of the discrete tensioned positions for the user. In this instance, the footwear controller may receive a sensor signal from the lace sensor that is indicative of the current discrete tensioned position for the user. From this data, the controller may determine if the current discrete tensioned position corresponds to a memory-stored validated lace tensioned position; the activation command signal for the IES light system may be transmitted in response to the current discrete tensioned position corresponding to the validated lace tensioned position.

For any of the disclosed IES systems, the remote computing node may include an optical sensor that is operable to detect the predetermined light output of the IES light system. This light output may include a personalized color and/or blinking pattern that is configured to verify the user to the remote computing node. For at least some embodiments, the IES system's wireless communications device includes a BLE, CAT-M1 and/or CAT-NB1 wireless interface. The IES system may also include a barcode, an RFID tag, and/or an NFC tag attached to the sole structure/upper, each of which is configured to communicate a security authentication code to the remote computing node.

Additional aspects of the present disclosure are directed to a method of manufacturing an article of footwear for a foot of a user. This method includes: providing an upper that is configured to receive and attach to the foot of the user; providing a sole structure that is configured to support thereon the foot of the user, the sole structure having an outsole defining a ground-engaging portion; attaching the sole structure to the upper; mounting a light system to the sole structure and/or the upper, the light system being configured to generate light in response to a command signal; mounting a wireless communications device to the sole structure and/or the upper, the wireless communications device being configured to wirelessly communicate with a remote computing node; and mounting a resident controller to the sole structure and/or the upper, the resident controller being operatively connected to the wireless communications device and the light system. The resident controller is configured to: receive location data indicative of the user's location; receive location data indicative of the remote computing node's location; determine whether the user's location is within a predetermined location or proximity to the node's location; and, responsive to the user being within the predetermined location/proximity to the node, transmitting a command signal to the light system to generate a predetermined light output.

Other aspects of this disclosure are directed to a method of executing an automated feature of an intelligent electronic shoe. The IES includes an open or closed-construction upper for attaching to a foot of a user, a sole structure that is attached to the upper and defines a ground-engaging surface, and a light system that is operable to generate light in response to an electronic command signal. The method includes receiving, by a resident footwear controller via a wireless communications device, location data indicative of a user's location and location data indicative of a remote computing node's location. The method also includes determining, via the footwear controller, whether the user's location is within a predetermined location or proximity to the node's location. In response to the user's location being within the predetermined location/proximity to the node's location, the footwear controller automatically transmits a command signal to the light system to generate a predetermined light output.

For any of the disclosed methods, the footwear controller may further respond to the user's location being within the predetermined location/proximity to the node's location by transmitting a second command signal to a control system of the remote computing node to generate an audible or visual output. In some applications, the remote computing node is a motor vehicle with a vehicle headlamp system; in this instance, the visual output includes illumination, flashing and/or intensification of the light output of the vehicle's headlamp system. Optionally, the footwear controller may coordinate the light output of the vehicle's headlamp system with the predetermined light output of the IES's light system. The commanded audible output of the motor vehicle may include activation and/or modulation of an audible output of the vehicle's horn system.

For any of the disclosed methods, the wireless communications device may be configured to wirelessly connect to a portable electronic device of the user and thereby wirelessly communicate with the remote computing node. As yet a further option, the IES may include a haptic transducer that is attached to the sole structure and/or upper; in this instance, the footwear controller may automatically transmit a third command signal to the haptic transducer to generate a haptic cue in response to the user's location being within the predetermined location/proximity to the node's location. The IES may also include an audio system that is attached to the sole structure and/or upper; in this case, the footwear controller may automatically transmit a fourth command signal to the audio system to generate a predetermined sound output in response to the user's location being within the predetermined location/proximity to the node's location.

For any of the disclosed methods, the remote computing node may be a segment of a residential or commercial security system. In this instance, the footwear controller may automatically transmit a deactivation (or activation) command signal to the security system in response to the user entering (or leaving) a predetermined location or proximity with respect to a designated section of a residential or commercial building associated with the security system. Optionally, the remote computing node may be a segment of a home automation system. In this instance, the footwear controller may respond to the user entering or leaving a home (or a section of a home) associated with the home automation system by transmitting a fifth command signal to the home automation system to lock or unlock a door, activate or deactivate a room light, and/or increase or decrease a temperature of a thermostat. The predetermined location or proximity may be defined, at least in part, by a geofence that is generated by the footwear controller. Activation or deactivation command signals may be transmitted to a remote computing node or an IES subsystem upon detection of the remote computing node or the IES user breaching the geofence.

For any of the disclosed methods, the IES may incorporate therein a pressure sensor that is mounted to the sole structure or upper and configured to detect a presence of a foot in the upper. Transmission of a command signal by the footwear controller may be further in response to the detected presence of the foot in the upper. A pressure sensor mounted to the sole structure/upper may be configured to detect the user's weight. In this instance, the footwear controller receives one or more sensor signals from the pressure sensor that is/are indicative of the detected weight of the user. The controller then determines if the detected weight is within a predetermine range of a memory-stored validated user weight. A command signal may be transmitted to the remote computing node or an IES subsystem in response to the detected weight being within the predetermine range of the validated user weight.

For any of the disclosed methods, the IES may include a shoelace or strap that is attached to the upper, and a lace motor mounted to the shoe structure and configured to selectively transition the lace/strap between tensioned and untensioned states. In this instance, the resident footwear controller may determine whether the shoelace is in the tensioned or untensioned state and, if the lace is tensioned, responsively transmit a command signal to activate an IES subsystem. The tensioned state may be delineated into a plurality of discrete tensioned positions. In this instance, the resident footwear controller may identify which of the discrete tensioned positions the lace is in (e.g., using sensor signals received from a lace sensor or by monitoring a position of the lace motor output shaft). Responsive to the current tensioned position of the lace corresponding to a memory-stored validated lace tensioned position, the footwear controller may transmit a command signal to a remote node or an IES subsystem.

For any of the disclosed methods, the remote computing node may include an optical sensor; in this instance, the predetermined light output of the IES light system may include a personalized color and/or a blinking pattern that is detectable by the optical sensor and configured to verify the user to the remote computing node. The IES wireless communications device may include a BLE, CAT-M1 and/or CAT-NB1 wireless interface. The IES may be provided with a barcode, an RFID tag, and/or an NFC tag attached to the sole structure and/or upper and configured to communicate a security authentication code to the remote computing node.

Additional aspects of this disclosure are directed to footwear for a foot of a user. The footwear includes an upper for receiving and attaching to the user's foot, and a sole structure that is attached to the upper for supporting thereon the user's foot. A light system and/or sound system is/are mounted to the sole structure and configured to generate light/sound in response to a command signal. A wireless communications device is mounted inside the sole structure for wirelessly communicating with a remote computing node. A resident controller, which is also mounted inside the sole structure, is operatively connected to the wireless communications device and light system. The resident controller receives location data indicative of the user's location and the remote computing node's location. The resident controller determines whether the user's location is within a predetermined location/proximity to the node's location; if so, the resident controller responsively transmits one or more command signals to the light system/sound to generate a predetermined light/sound output.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:

1. A method of operating an intelligent electronic shoe (IES), the IES including shoe structure for attaching to and supporting thereon a foot of a user, and a controller attached to the shoe structure, the method comprising:
   connecting, via a wireless communications device attached to the shoe structure, the controller to a remote computing node, the remote computing node including a portable electronic device borne by the user and wirelessly communicating with a third-party host system;
   receiving, via the controller from the remote computing node over the wireless communications device, a first input signal indicating a user location of the user wearing the IES is within a predetermined location of and/or a predetermined proximity to a motor vehicle;
   transmitting, via the controller to an alert system with a lighting component attached to the shoe structure in response to receipt of the first input signal, an alert command signal to output a visible alert perceptible by the user and/or the motor vehicle; and
   coordinating, via the controller, the visible alert output by the lighting component with a vehicle light output from the motor vehicle.

2. The method of claim 1, wherein the visible alert includes a lighting pattern, and wherein coordinating the visible alert includes the controller coordinating the lighting pattern of the lighting component with a vehicle lighting pattern of the vehicle light output.

3. The method of claim 2, wherein the motor vehicle includes a vehicle headlamp system, the vehicle lighting pattern includes illumination, flashing, color modification, and/or intensification of the vehicle headlamp system, and wherein coordinating the visible alert includes coordinating illumination, flashing, color modification, and/or intensification of the lighting pattern output by the lighting component with the vehicle lighting pattern.

4. The method of claim 1, further comprising coordinating, via the controller, the visible alert output by the lighting component of the IES with a visual, audible, or tactile output of the portable electronic device of the user.

5. The method of claim 1, wherein the motor vehicle includes an optical sensor, the visible alert includes a personalized color and/or a blinking pattern detectable by the optical sensor, and coordinating the visible alert output by the lighting component includes coordinating the personalized color and/or the blinking pattern with a color and/or a blinking pattern of the vehicle light output form the motor vehicle.

6. The method of claim 5, further comprising receiving, via the controller, a second input signal indicating a resident vehicle controller of the motor vehicle verified the user by evaluating the personalized color and/or the blinking pattern detected by the optical sensor.

7. The method of claim 1, wherein the alert system further includes an audio component attached to the shoe structure, the method further comprising the controller transmitting, responsive to receipt of the first input signal, a command signal to the audio component to generate a user-perceptible sound output.

8. The method of claim 1, wherein the alert system further includes a haptic transducer attached to the shoe structure, the method further comprising the controller transmitting, responsive to receipt of the first input signal, a command signal to the haptic transducer to generate a user-perceptible haptic cue.

9. The method of claim 1, further comprising receiving, via the controller from a sensor attached to the shoe structure, a sensor signal indicating the foot of the user is present in an upper of the shoe structure, and wherein the alert command signal is transmitted further in response to receipt of the sensor signal.

10. The method of claim 1, wherein the predetermined proximity is defined by an active geofence generated by the controller of the IES or the portable electronic device of the user, and wherein the alert command signal is transmitted by the controller to the alert system upon detection of the motor vehicle breaching the active geofence.

11. A non-transitory, computer-readable medium (CRM) storing instructions executable by one or more processors of a controller of an intelligent electronic shoe (IES), the IES including shoe structure for attaching to and supporting thereon a foot of a user, the instructions, when executed by the one or more processors, causing the controller to perform operations comprising:
  connecting to a remote computing node via a wireless communications device attached to the shoe structure, the remote computing node including a portable electronic device borne by the user and wirelessly communicating with a third-party host system;
  receiving, from the remote computing node over the wireless communications device, a first input signal indicating a user location of the user wearing the IES is within a predetermined location of and/or a predetermined proximity to a motor vehicle;
  transmitting, to an alert system with a lighting component attached to the shoe structure in response to receipt of the first input signal, an alert command signal to output a visible alert perceptible by the user and/or the motor vehicle; and
  coordinating the visible alert output by the lighting component with a vehicle light output from the motor vehicle.

12. The CRM of claim 11, wherein the visible alert includes a lighting pattern, and wherein coordinating the visible alert includes the controller coordinating the lighting pattern of the visible alert with a vehicle lighting pattern of the vehicle light output.

13. The CRM of claim 12, wherein the motor vehicle includes a vehicle headlamp system, the vehicle lighting pattern includes illumination, flashing, color modification, and/or intensification of the vehicle headlamp system, and wherein coordinating the visible alert includes coordinating illumination, flashing, color modification, and/or intensification of the lighting pattern output by the lighting component with the vehicle lighting pattern.

14. The CRM of claim 11, wherein the instructions further cause the controller to coordinate the visible alert output by the lighting component of the IES with a visual, audible, or tactile output of the portable electronic device of the user.

15. The CRM of claim 11, wherein the motor vehicle includes an optical sensor, the visible alert includes a personalized color and/or a blinking pattern detectable by the optical sensor, and coordinating the visible alert output by the lighting component includes coordinating the personalized color and/or the blinking pattern with a color and/or blinking pattern of the vehicle light output form the motor vehicle.

16. The CRM of claim 15, wherein the instructions further cause the controller to receive a second input signal indicating a resident vehicle controller of the motor vehicle verified the user by evaluating the personalized color and/or the blinking pattern detected by the optical sensor.

17. The CRM of claim 11, wherein the alert system further includes an audio component attached to the shoe structure, and wherein the instructions further cause the controller to transmit, responsive to receipt of the first input signal, a command signal to the audio component to generate a user-perceptible sound output.

18. The CRM of claim 11, wherein the alert system further includes a haptic transducer attached to the shoe structure, and wherein the instructions further cause the controller to transmit, responsive to receipt of the first input signal, a command signal to the haptic transducer to generate a user-perceptible haptic cue.

19. The CRM of claim 11, wherein the instructions further cause the controller to receive, from a sensor attached to the shoe structure, a sensor signal indicating the foot of the user is present in an upper of the shoe structure, and wherein the alert command signal is transmitted further in response to receipt of the sensor signal.

20. The CRM of claim 11, wherein the predetermined proximity is defined by an active geofence generated by the controller of the IES or the portable electronic device of the user, and wherein the alert command signal is transmitted by the controller to the alert system upon detection of the motor vehicle breaching the active geofence.

* * * * *